United States Patent Office 3,131,223
Patented Apr. 28, 1964

3,131,223
PROCESS FOR THE PRODUCTION OF ALDEHYDES AND KETONES
Jurgen Smidt, Munich-Solln, Walter Hafner and Josef Sedlmeier, Munich, Reinhard Jira, Munich-Pasing, and Rudolf Ruttinger, Deisenhofen, near Munich, Germany, assignors to Consortium für elektrochemische Industrie G.m.b.H., Munich, Germany, a corporation
No Drawing. Filed Dec. 27, 1957, Ser. No. 705,491
Claims priority, application Germany Jan. 4, 1957
12 Claims. (Cl. 260—597)

The present invention relates to a process for the production of carbonyl compounds from olefines.

In the past carbonyl compounds, such as, for example, acetaldehyde and ketones, have been prepared from olefines in a two stage process. In general in such process the olefine is first hydrated to produce an alcohol and this is then dehydrogenating or oxidized to an aldehyde or ketone in a further stage. Essentially two processes have been employed for the hydration, namely, a liquid phase process in which alkyl sulfate is produced as an intermediate product and a gas phase process employing phosphoric acid or tungsten oxide as a catalyst.

These processes, however, are not completely satisfactory and, as a consequence, endeavors have been made to produce aldehydes or ketones by a direct oxidation of hydrocarbons. In such proposed processes essentially saturated hydrocarbons, especially butane, and also propane pentane, petroleum ether and gas oil, were reacted in the gaseous phase at high temperatures together with oxygen and water vapor. These oxidation processes, however, are not specific and produce a mixture of various oxygen containing compounds including also alcohols and organic acids.

According to the invention it was unexpectedly found that olefines can be converted with good yields to the corresponding carbonyl compounds when olefines together with oxygen or oxygen containing gases are passed over platinum metal compound catalysts in the presence of water vapor or substances which under the reaction conditions produce water vapor.

The formation of the carbonyl compounds already proceeds with noticeable velocity at room temperatures and below, and can be favored by use of elevated temperatures.

The selection of the optimum reaction temperature above all depends upon the boiling point of the olefines and the corresponding carbonyl compounds, as it usually is above such boiling points. However, the process according to the invention can be carried out with more or less success at any temperature between above the freezing point of water and a maximum of about 300° C. The upper temperature limit can vary a little from case to case and in some instances it is determined by the instability of the catalyst employed and in other instances by the occurrence of uncontrolled oxidation by chain reactions. The later is discernible by the formation of oxidation products such as formaldehyde and carbon dioxide. Preferably, reaction temperatures between about 50 and 300° C. are employed depending upon the olefine and the catalyst used. For example, when palladium compounds are employed for the conversion of ethylene a temperature range between 50 and 120° is preferred and with other platinum metal compounds and higher olefines temperatures between 80 and 200° C. are favorable.

The catalysts employed according to the invention are platinum metal compounds and particularly those of palladium and rhodium. While the platinum metals per se have no noteworthy activity, they can be present in the catalytic bodies employed as during progress of the process they can be converted into the catalytically active compounds under the particular conditions employed.

The active components of the platinum metal compounds are the platinum metal ions. The type of non-metallic component of such compounds is only of secondary importance. For example, only gradual differences exist between such different coordination partners as the phosphate and hydroxyl groups. Halogen compounds have, however, been found particularly favorable. The oxidation state of the platinum metal in the compounds employed is also of secondary importance and it is believed that the necessary oxidation stage is automatically achieved during the reactions. Illustrative examples of suitable platinum metal compounds, for example, are $PdCl_2$, $PdBr_2$, $Pd_3(PO_4)_2$, $PtCl_2$, $CuPtBr_6$, $Na_2Pt(OH)_6$, $RhCl_3$, $H_2IrCl_6$, $RuCl_3$ and the like.

The action of the platinum metal compounds can in many instances be improved by the addition of salts of other metals, particularly salts of metals which are multivalent which upon transition from one valence to another can tend to promote the oxidation. Illustrative examples of salts of such other metals, for instance are $FeCl_3$, $Fe(NO_3)_3$, $Fe_2(SO_4)_3$, $CuCl_2$, $CuBr_2$, $CuSO_4$, $Cu(OAc)_2$, $MnCl_2$, $MnSO_4$, $CoCl_2$ and $VOSO_4$ and the like.

Such salts of other metals in general are used in relatively larger quantities than the platinum metal compounds. However, too large an excess should be avoided as otherwise the efficiency of the catalyst will again drop. The optimal proportions are easily ascertained by simple tests. Favorable effects can also be achieved with mixtures of salts of other metals.

Furthermore, the action of the platinum metal compound catalysts can in many instances be increased by the addition of acidic substances such as, for example, HCl, $H_3PO_4$ and HOAc. In many instances it has been found advisable to add such acidic substances not only at the beginning of the operation of the catalyst but also during use of the catalyst, particularly when after longer operations its activity has become reduced.

Other additions to the catalyst can also be of advantage. For example, the incorporation of hygroscopic substances such as, for example, $CaCl_2$ and $Mg(ClO_4)_2$ can be of advantage as will be more fully explained below.

The active catalytic substances employed according to the invention preferably are supported upon carriers having a large surface area such as, for example, active carbon, alumina, silica gel, pumice, and various silicates. The method of application of the catalytic substances to the carrier can be in accordance with well known procedures producing supported catalysts. For example, the platinum metal compounds, as well as other metal salts, can be dissolved in water, if necessary with the addition of acids, and the carriers impregnated therewith. On the other hand, the platinum metals can be applied as such to the carrier and then be converted to the desired compound upon the carrier. In supported catalysts the quantity of the individual catalytic substances can be as low as 0.1% of the total weight of the catalyst body but preferably should be at least 1% thereof. The total quantity of the catalytically active substances upon the carrier depends upon the nature of the carrier and can be up to about 40%. The preferred ratio of platinum metal compound to salt of another metal is such as to provide a ratio of platinum metal to other metal between 1:1 to 1:20.

The water vapor content of the reaction gases employed according to the invention is of special significance. The presence of water vapor in such reaction gases has an entirely different function than the water vapor employed in previously known oxidation reactions. In general in the known oxidation reactions the addition of the water vapor has as its primary purpose the moderation of the oxidation which proceeds as a radical chain reaction. The process according to the invention does not involve a chain reaction. It was, however, found that the catalyst must maintain a certain moisture content if its activity is to be retained over long periods of operation. The water which is adsorbed on the catalyst enters an equilibrium with the water vapor contained in the reaction gases, so that the reaction gases should contain a certain amount of water vapor so as not to disturb the adsorbed water content of the catalysts. The optimum water vapor content of the reaction gases depends upon various factors, above all the reaction temperature and also the type of catalyst carrier employed. The composition of the catalytically active substances is also not without influence. Also the presence of hygroscopic substances in the catalyst body can serve to maintain a proper water balance in the catalyst body when it is impractical or undesirable to adjust such balance merely by the water vapor content of the reaction gases. The optimum water vapor content of the reaction gases for the case at hand is easily ascertained by simple routine tests, for example, by carrying out the process employing reaction gases containing various water vapor contents and plotting the conversions achieved after a longer period, for example, 50 hours, of operation of the catalyst. The content of water vapor in the reaction gases can, for example, depending upon the temperature, pressure and type of catalyst, vary between 2 and 80 vol. percent. As a general rule, when reaction temperatures below 100° C. are employed it is preferable to operate near the dew point of the water vapor and at higher temperatures the required relative moisture content becomes increasingly less. Of course, when the reaction gases contain hydrogen which forms water at the catalyst the optimum quantity of hydrogen or of hydrogen and water vapor can easily be determined as indicated above.

The oxygen employed for the oxidation according to the invention can be supplied in the form of pure oxygen, air or air enriched in oxygen. The selection depends upon the economic aspects of the case at hand. When pure oxygen is not used and the process is carried out with recycling it will be necessary to remove the nitrogen and other inert gases which accumulate in the recycled gases. When it is not necessary that the olefines be used up completely the process can be carried out with an excess of air and to carry out the reaction under such conditions that the main quantity of olefine is converted in one pass.

The oxygen content of the reaction gases employed according to the invention should be rather high to ensure a good olefine conversion. However, as a general rule, it is advisable to operate below the explosive limits, although with care it is possible with mixtures slightly above the explosive limits. The explosive limits of olefine-oxygen or, respectively, olefine-air mixtures depends upon the type of olefine as well as the dilution with inert gases such as water vapor. For ethylene it has been found preferable to work with olefine to oxygen ratios between 2:1 and 5:1 and for propylene and butylene the preferred olefine to oxygen ratios are between 1:1 and 3:1. Preferably, the oxygen content of the entire reaction gas mixture does not exceed about 16%. The olefine content of the entire reaction gas mixture can lie between 10 and 90%.

The process according to the invention can be carried out under most varied pressures, for example, between about 20 mm. Hg and 100 atmospheres and preferably between 0.1 and 20 atmospheres. With increased pressures the space-time efficiency of the catalyst can be increased without any decided change in the conversion. However, in the application of higher pressures it is preferable that the olefinic components of the reaction gases, as well as the carbonyl compounds produced, still be maintained in the gas phase as otherwise an inhibition of the reaction occurs. For this reason it can be of advantage to employ reduced pressures in the conversion of higher olefines.

The time the reaction gas mixture remains in contact with the catalyst can be varied over wide limits and can be adapted to the conditions at hand. The conversion first increases rapidly with increasing time of contact with the catalyst and finally asymptotically approaches the theoretical maximum value. However, with increasing time of contact the quantity of gas passed over the catalyst drops linearly. Consequently, the space-time efficiency, which depends upon the conversion as well as the quantity of gas passed over the catalyst, exhibits a flat maximum. The optimal times of contact with the catalyst lie near this maximum and can, depending upon the catalyst type and other reaction conditions, amount to between 0.1 and 60 seconds. Short periods of contact are preferred with recycling and longer periods of contact permit a high conversion with a single pass. In general, the use of too long periods of contact does not deleteriously affect the course of the reaction in the sense of producing undesired by-products. Only in the instance of the conversion of ethylene there is a certain tendency of resinification when the aldehyde formed is withdrawn too slowly from the reaction zone.

The process according to the invention cannot only be carried out using pure olefines as starting materials but also with technical gases containing various impurities and also, as already has been indicated, hydrogen. Carbon dioxide, nitrogen and saturated hydrocarbons are inert with respect to the process. Carbon monoxide is oxidized to carbon dioxide and hydrogen is oxidized to water. Acetylene, hydrogen sulfide and organic sulfur compounds have a slight inhibiting effect upon the catalyst. However, a lasting poisoning of the catalysts does not occur with these substances as the platinum metal complexes thereof are continuously destroyed by oxidation during the course of the process. Nevertheless, a portion of the oxidation capacity of the catalyst is used up therefore and therefore it is not available for the desired oxidation reaction. For example, in the oxidation of ethylene with a supported catalyst containing 3% $PdCl_2$ and 10% $FeCl_3$ at 105° C. at atmospheric pressure the conversion achieved is 25% with pure ethylene and 20% with technical ethylene containing about 1200 p.p.m. of acetylene. For economic reasons therefore it is preferably to maintain the impurities in the gases to a minimum in order to maintain highest efficiency of the catalyst for the desired reaction.

While at the present time the process has greatest economic significance in the production of carbonyl compounds from the lower mono-olefines which are produced in the petroleum industry, it is also applicable to higher olefines and even to aromatic olefines such as styrene. The process has also been carried out with di-olefines such as butadiene to produce crotonaldehyde and with cycloalkylene compounds, such as cyclohexene, with the production of cyclohexanone. Preferably the process is carried out with aliphatic mono-olefine hydrocarbons. The high selectivity of the process according to the invention in the production of carbonyl compounds can possibly be explained in that the olefines are temporarily bound in complexes in which the platinum metal ion functions as a coordination center. While the exact reaction mechanism cannot be ascertained with certainty, it appears that the oxidation step involves a transfer of charge from the olefinic ligand to the coordination center. The olefinic ligand thereby reacts with the water and after intramolecular rearrangement is desorbed as the carbonyl compound while the actual oxidizing agent, namely, the oxygen, only is indirectly involved in the reaction apparently over a redox reaction with the components of the platinum metal compounds employed as the catalyst. This, while unproven, theory of reaction would explain the selectivity and high velocity of the reaction at relatively low temperatures, as well as the definite and uniform course of the oxidation.

The process according to the invention can be carried out in all apparatus suited for the conversion of gases with solid catalysts such as, for example, tube systems or fluidized bed reactors. Of course, care must be taken that the parts of the apparatus which come into contact with the catalyst are corrosion resistant. Suitable corrosion resistant materials, for example, are enamel, glass, porcelain, stone ware, synthetic resins, rubber, titanium, tantalum, Hastelloy and the like.

The carbonyl compounds produced can be recovered in a simple manner from the reaction gas mixture by condensation or scrubbing. The very specific course of the reaction leads to uniform products of high purity in almost quantitative yields. No by-products are produced which upon recycling of the unconverted starting materials will cause disturbances because of their accumulation.

The present invention therefore renders it possible to produce important carbonyl compounds by an extraordinarily simple single step process which can be carried out continuously from easily available starting materials.

The following examples illustrate a number of embodiments of the process according to the invention:

Example 1

100 parts by weight of a palladium-active carbon catalyst containing 5% palladium (Organic Synth. 26, page 78, example D) were washed with 500 parts by weight of 1 n HCl and then dried over calcium chloride for 15 hours. Considerable HCl was taken up by the active carbon and this in the presence of air reacted with the finely divided Pd to produce sufficient $PdCl_2$, even initially, to provide an active catalyst.

A gas mixture consisting of 86% $C_2H_4$, 8% $O_2$ and 6% $H_2$ was saturated at 40° C. with water vapor and passed through a bundle of tubes containing the catalyst at the same temperature. The acetaldehyde formed was removed from the exhaust gas by scrubbing. The conversion obtained in a single pass was 3.1%.

Example 2

A gas mixture composed of 91% $C_2H_4$ and 9% $O_2$ was saturated with water vapor at 50° C. and passed at such temperature over a catalyst containing 3% Pd which was prepared in the same manner as that in Example 1. The acetaldehyde formed was removed from the reaction gases by cooling such gases and condensation. The remaining gas mixture after replenishment by addition of a quantity of oxygen was recycled over the catalyst. In such cyclic process 56 g. of acetaldehyde was produced from 40 g. of ethylene which corresponds to an 89% yield.

Example 3

8 parts by weight of palladious chloride and 9 parts by weight of calcium carbonate were dissolved in dilute HCl and after addition of 100 parts by weight of granulated active carbon the mixture was evaporated to dryness at 120° C.

A gas mixture composed of 80% propylene and 20% oxygen was saturated with water vapor at 63° C. and passed at the same temperature over the thus prepared catalyst. In a single passage over such catalyst 2.2 parts by weight of acetone were produced from 52 parts by weight of propylene.

Example 4

10 parts by weight of $PdCl_2$, 15 parts by weight of calcium chloride and 10 parts by weight of ferric chloride were dissolved in water and applied to 100 parts by weight of granulated active carbon.

When 30 parts by weight of a mixture of 84 vol. percent of ethylene and 16 vol. percent of oxygen which had been saturated with water vapor at 90° C. was passed over the thus prepared catalyst at 105° C., 10.5 parts by weight of acetaldehyde were produced in a single pass. The conversion based upon the ethylene therefore was 27%.

Example 5

16 parts by weight of a mixture of 20 vol. percent of oxygen and 80 vol. percent of a mixture of 1-2-butylene which had been saturated with water vapor at 63° C. was passed at 83° C. over 100 parts by weight of a catalyst prepared as in Example 3. In a single pass 0.34 part by weight of methyl ethyl ketone were produced. This corresponded to a 1.9% conversion.

Example 6

30 parts by weight of a mixture of 80 vol. percent of propylene and 20 vol. percent of oxygen saturated with water vapor at 90° C. were passed over the same catalyst as in Example 4 under the same conditions. 6.3 parts by weight of acetone were produced. This corresponded to an 18% conversion of the propylene.

Example 7

10 parts by weight of an active carbon ("Supersorbon WS III," an active carbon of vegetable origin activated with steam at 800–1000° C.) were impregnated with 0.1 part by weight of $PdCl_2$, 0.5 part by weight of $CuCl_2 \cdot 2H_2O$ and 0.3 part by weight $MnCl_2 \cdot 4H_2O$ in 9 parts by weight of water and then dried at 105° C.

A mixture of 67 vol. percent of water vapor, 5.3 vol. percent of $O_2$ and 27.7 vol. percent of $C_2H_4$ were passed over this catalyst at a temperature of 99° C. at a pressure of 720 mm. Hg. In 1 hour, 1.5 parts by weight of acetaldehyde were produced from 4.1 parts by weight of ethylene. This corresponds to a 24% conversion of the ethylene.

Example 8

A silicate catalyst carrier of type KS 40 of Süd-Chemie AG of a grain size 3–4 mm. (produced by treatment of montmorillonite with $H_2SO_4$ and calcining at 600° C. and containing about 75% $SiO_2$ and 15% $Al_2O_3$) was employed. 0.5 part by weight of $Cu(C_2H_3O_2)_2 \cdot H_2O$ were first applied to this carrier and then 0.2 part by weight of $PdCl_2$ together with 0.3 part by weight of $FeCl_3$ and 0.5 part by weight of $Mg(ClO_4)_2$.

When a mixture of 5 parts by weight of a mixture of 84 vol. percent of $C_2H_4$ and 16 vol. percent of oxygen with 0.56 part by weight of water vapor was passed in an hour over the thus prepared catalyst at a catalyst temperature of 80° C., 1.45 parts by weight of acetaldehyde were produced. This corresponds almost to a 23% conversion of the ethylene.

Example 9

0.3 part by weight of $PdBr_2$, 0.5 part by weight of $Fe(NO_3)_3 \cdot 9H_2O$ and 0.75 part by weight of $CuBr_2$ were applied to 10 parts by weight of active carbon ("Supersorbon WS III") by impregnation with an aqueous solution.

When 6.7 parts by weight of a mixture of 16 vol. percent of $O_2$ and 84 vol. percent of $C_2H_4$ which previously had been saturated with water vapor at 88° C. were passed in an hour over the thus prepared catalyst at a temperature of 100° C., 0.92 part by weight of acetaldehyde were produced. This corresponds to about a 10% conversion of the ethylene.

Example 10

10 parts by weight of active carbon ("Supersorbon WS III") were impregnated with a concentrated aqueous solution of 0.2 part by weight of $PdCl_2$, 0.4 part by weight of $FeCl_3$ and 1 part by weight of $CuCl_2 \cdot 2H_2O$ and then dried. Thereafter, 1 part by weight of $H_3PO_4$ ($d=1.7$) and 15 parts by weight of $H_2O$ were added and the impregnated active carbon again dried at 105° C.

6.7 parts by weight of a mixture of 16 vol. percent of $O_2$ and 84 vol. percent of $C_2H_4$ which had previously been saturated with water vapor at 89° C. were passed per hour over the thus prepared catalyst at 100° C. After 25 hours' operation acetaldehyde was produced at a rate of 2.6 parts by weight per hour. This corresponds to an ethylene conversion of more than 28%.

*Example 11*

0.2 part by weight of $PdCl_2$, 1 part by weight of $CuCl_2 \cdot 2H_2O$ and 0.4 part by weight of $FeCl_3$ were dissolved with warming in 18 parts by weight of water and 10 parts by weight (10 g.) of active carbon ("Supersorbon WS III") were added thereto and the mixture evaporated to dryness with stirring at 105° C. over a period of 2 hours.

When the water vapor saturated gas mixture of 84 vol. percent $C_2H_4$ and 16 vol. percent $O_2$ was passed over this catalyst at 20° C., 0.22 part by weight of acetaldehyde were produced per hour from 3.8 parts by weight of $C_2H_4$. This corresponded to a 3.7% conversion of the ethylene.

*Example 12*

0.5 part by weight of $Cu(C_2H_3O_2)_2 \cdot H_2O$ and 0.2 part by weight of $PdCl_3$ together with 0.3 part by weight of $FeCl_3$ were applied to a silicate carrier as in Example 8.

When a gas mixture of 16 vol. percent $C_2H_4$ and 84 vol. percent of air which had previously been saturated with water vapor at 71° C. was passed over such catalyst at 80° C., 0.88 part by weight of acetaldehyde were produced per hour from 0.77 part by weight of $C_2H_4$. This corresponds to an ethylene conversion of about 72%.

*Example 13*

1 part by weight of $PdCl_2$, 1 part by weight of $CaCl_2$ and 0.3 part by weight of $FeCl_3$ were dissolved in a small quantity of water while warming. Thereafter, 10 parts by weight of active carbon ("Supersorbon WS III") were added and the mixture evaporated to dryness at 105° C. with occasional stirring.

A mixture of 70 vol. percent water vapor, 9 vol. percent $O_2$ and 21 vol. percent $C_2H_4$ was passed over this catalyst at 100° C. With an hourly throughput of 3 parts by weight of $C_2H_4$, 3.1 parts by weight of acetaldehyde were obtained. This corresponded to a space-time efficiency of 103 g. acetaldehyde per liter of catalyst per hour.

*Example 14*

A mixture of 34 vol. percent of water vapor, 13 vol. percent of $O_2$ and 53 vol. percent of $C_3H_6$ was passed over the same catalyst as employed in Example 12 at a temperature of 80° C. and a pressure of 0.68 atmosphere absolute. In one hour, 1.7 parts by weight of acetone were produced from 14.2 parts by weight of $C_3H_6$. This corresponded to an 8.7% conversion of the propylene into acetone.

*Example 15*

A catalyst was prepared by impregnating 5 parts by weight of active carbon ("Supersorbon WS III") with an aqueous solution of 0.1 part by weight of $PdCl_2$, 0.7 part by weight of $CuSO_4 \cdot 5H_2O$ and 0.4 part by weight of $Fe_2(SO_4)_3 \cdot 9H_2O$ and drying at 105° C.

A mixture of 84 vol. percent of $C_2H_4$ and 16 vol. percent $O_2$ which had been saturated with water vapor at 89° C. was passed over such catalyst at 99° C. In one hour, 0.48 part by weight of acetaldehyde were produced from the 4.1 parts by weight of the ethylene passed over the catalyst. This corresponded to a space-time efficiency of 32 g. of acetaldehyde per liter of catalyst per hour.

*Example 16*

17 g. of active carbon ("Supersorbon WS III") were impregnated portionwise with a solution of 1.6 g. $PtCl_2$ in dilute HCl. After short drying, 3 g. $FeCl_3$ were applied by impregnation with an aqueous solution thereof.

A gas mixture of 72.8 vol. percent of water vapor, 21.8 vol. percent $C_3H_6$ and 5.4 vol. percent $O_2$ was passed over this catalyst at a velocity of 8.8 liters per hour at 150° C.

In the course of five hours, 1.35 g. of acetone were produced. This corresponded to a 6.6% conversion of the propylene.

*Example 17*

18 parts by weight of active carbon ("Supersorbon WS III") were impregnated with an aqueous solution of 3 parts by weight of copper (II)-hexabromoplatinate (IV) and dried at 105° C.

A gas mixture of 79 vol. percent of propylene and 21 vol. percent of $O_2$ which had been saturated with water vapor at 90° C. was passed over the catalyst at 150° C. During five hours' operation, 16 parts by weight of propylene were passed over the catalyst and 1.7 parts of acetone were produced. This corresponded to a 7.7% conversion of the propylene.

*Example 18*

21.2 parts by weight of silica gel (W 760/150 Kalichemie, Hannover, produced by usual wet precipitation and drying) were impregnated with a solution of 1.8 parts by weight of rhodium oxyhydrate (54.7% Rh) in dilute HCl and dried at 105° C.

A propylene-oxygen mixture containing 20% of oxygen which had been saturated with water vapor at 91° C. was passed over such catalyst at 150° C. In five hours' operation, 0.74 part by weight of acetone were obtained from the 8 parts by weight of propylene passed over the catalyst. This corresponded to a 6.7% conversion.

*Example 19*

10 parts by weight of active carbon ("Supersorbon WS III") were impregnated with a concentrated aqueous solution of 1 part by weight of $FeCl_3$ and 0.75 part by weight of $PdCl_2$ and then dried for two hours at 105° C.

A gas mixture of 10.5 parts by weight of an n-butene isomer mixture and 1.5 parts by weight of $O_2$ which had previously been saturated with water vapor at 89° C. was passed over this catalyst at normal pressure in an hour at 99° C. 1.6 parts by weight of methyl ethyl ketone were produced. This corresponded to a yield of almost 12%.

*Example 20*

0.1 part by weight of $PdCl_2$, 0.5 part by weight of $CuCl_2 \cdot 2H_2O$ and 0.2 parts by weight of $FeCl_3$ were applied to 5 parts by weight of kieselguhr, which by means of binding agents was baked to give rigid plates and was then milled until a granulation of 3–5 mm. was obtained. ("Duranit," Schiebs & Co.)

When a gas mixture of 84 vol. percent $C_2H_4$ and 16% $O_2$ saturated with water vapor at 90° C. was passed at 105° C. over this catalyst, 0.11 part by weight of acetaldehyde were produced per hour from 3.68 parts by weight of ethylene.

*Example 21*

Palladium black was dissolved in a mixture of $H_3PO_4$ and $HNO_3$ while warming. The nitric acid was driven off by stronger heating and the remaining brown solution was carefully mixed with a ten-fold volume of ethyl acetate. The resulting ocher yellow precipitate was filtered off and rapidly washed with ethyl acetate and ether and then dried under vacuum.

0.4 part by weight of the palladium phosphate thus obtained were dissolved in 10 parts by weight of 1 n HCl and 10 parts by weight of active carbon ("Brilonit IV supra," a gas activated active carbon of vegetable origin activated with steam at 800–1000° C.) were added. After drying at 105° C., a solution of 0.4 part by weight of $FeCl_3$, 0.2 part by weight of $MnSO_4 \cdot H_2O$ and 1 part by weight of $CuSO_4 \cdot 5H_2O$ in 9 parts by weight of water were added and the mixture again dried at 105° C. for 2 hours.

A gas mixture of 4.26 parts by weight $C_2H_4$, 0.93 part by weight of $O_2$ and 1 part by weight of water was passed over this catalyst at 75° C. per hour. 1.9 parts by weight of acetaldehyde were produced per hour. This corresponds to a 28% conversion of the ethylene. About 75% of the oxygen was consumed.

*Example 22*

0.5 part by weight of palladium phosphate (produced as in Example 21) were dissolved together with 0.3 part by weight of $CoCl_2 \cdot 6H_2O$ in 10 parts by weight of 1 n HCl. 10 parts by weight of active carbon ("Brilonit IV supra") were added and the mixture evaporated to dryness at 105° C. Thereafter, a solution of 1 part by weight of $$Cu(C_2H_3O_2)_2 \cdot 2H_2O$$

in 18 parts by weight of water and 0.5 part by weight of acetic acid were allowed to be absorbed thereby in 3 portions (with drying between the addition of such portions). Finally, 0.2 part by weight of $VOSO_4 \cdot 5H_2O$ dissolved in 9 parts by weight of water were applied in the same manner and the catalyst dried at 105° C.

A gas mixture of 4.26 parts by weight of $C_2H_4$ and 0.93 part by weight of $O_2$ which had been saturated with water vapor at 70° was passed per hour over such a catalyst at 75° C. 1.6 parts by weight of acetaldehyde were produced per hour.

*Example 23*

7 parts by weight of a porous $Al_2O_3$ based carrier prepared by precipitation of $Al(NO_3)_3$ with ammonia according to DRP 561,713 were passed for 10 minutes in a 3% $NH_4VO_3$ solution, then dried and heated to 500° C. Then 0.07 part by weight of $PdCl_2$, 0.35 part by weight of $CuCl_2 \cdot 2H_2O$ and 0.14 part by weight of $FeCl_3$ were applied. A mixture of 84 vol. percent $C_2H_4$ and 16 vol. percent $O_2$ which had been saturated with water vapor at 90° C. was passed over the catalyst at 100° C. 0.035 part by weight of acetaldehyde were produced per hour from the 4.35 parts by weight of ethylene passed over the catalyst.

In the following Examples 24–27 which were carried out under superatmospheric pressures, an enamelled steel tube of 12 mm. inner diameter and 260 mm. long was used for the reaction vessel. The tube was provided with a jacket and was maintained at operating temperature by a circulating heating liquid.

*Example 24*

2.8 parts by weight of iridium (IV) oxide hydrate (71% Ir) were treated for 12 hours at 22° C. with dry hydrogen chloride at normal pressure. 16 parts by weight of active carbon ("Supersorbon WS III") were impregnated with an aqueous solution of the product and then dried at 105° C. Thereafter, 4 parts by weight of $FeCl_3$ were applied and 25 cc. were placed in the reaction tube. A gas mixture of 64 vol. percent of ethylene, 12 vol. percent $O_2$ and 24 vol. percent of water vapor was passed over said catalyst at a pressure of 11 atmospheres at a space velocity of 920 $h^{-1}$ and at a temperature of 150° C. 18.4 g. of acetaldehyde were produced per hour per liter of catalyst space.

*Example 25*

Active carbon ("Supersorbon WS III") was impregnated with 10% of Ru (in the form of water soluble ruthenium chloride) and 10% of $FeCl_3$. When used under the same conditions as in Example 24, the space-time yield was 17.6 g. acetaldehyde per liter of catalyst vol. per hour.

*Example 26*

Active carbon ("Supersorbon WS III") was impregnated with 10% of sodium hexahydroxyplatinate (IV) and 15% of $VOSO_4$. A gas mixture of 50 vol. percent of ethylene, 10 vol. percent of $O_2$ and 40 vol. percent $H_2O$ was passed over said catalyst at a pressure of 16 atmospheres absolute at a space velocity of 610 $h^{-1}$ and at a temperature of 200° C. The space-time yield of acetaldehyde was 10.3 g. per liter catalyst volume per hour.

*Example 27*

Active carbon ("Supersorbon WS III") was impregnated with 1.7% $PdCl_2$, 8.6% $CuCl_2$ and 3.4 percent $FeCl_3$. A gas mixture of 80 vol. percent $C_2H_4$, 15 vol. percent $O_2$ and 5 vol. percent $H_2O$ was passed over said catalyst at a space velocity of 610 $h^{-1}$, at a pressure of 6 atmospheres absolute and at 103° C. The space-time yield of acetaldehyde was 64 g. per liter of catalyst volume per hour.

*Example 28*

36 grams of a silicate carrier (KS 40) were impregnated with an aqueous solution of 1.5 g. $Cu(C_2H_3O_2)_2 \cdot 2H_2O$ and then dried. Then 0.4 g. $PdCl_2$ and 0.6 g. $FeCl_3$ were applied in the same manner.

10 liters of air which had been saturated with styrene at 32° C. and with water vapor at 93° C. were passed over this catalyst per hour at 130° C. In a single pass 15% of the styrene was converted to acetophenone.

*Example 29*

12 parts by weight of active carbon ("Brilonit IV supra") were impregnated with a solution of 0.5 part by weight of ammonia molybdate in 15 parts by weight of water and then dried. Then in the same maner 0.2 part by weight of $PdCl_2$ together with 1 part by weight of $CuCl_2 \cdot 2H_2O$ were applied to the contact and this dried at a temperature of 105° C.

When a mixture of 5.67 parts by weight $C_2H_4$, 1.25 parts by weight $O_2$ and 2.33 parts by weight of water were passed over the contact per hour at 79° C., after a starting-time of about 10 hours 1.4 parts by weight of acetaldehyde were obtained per hour.

*Example 30*

12 parts by weight of active carbon ("Brilonit IV supra") were impregnated with a concentrated aqueous solution of 1 part of weight $CuCl_2 \cdot 2H_2O$, 1 part by weight $VOSO_4 \cdot 5H_2O$ and 0.2 part by weight $PdCl_2$ and then dried at 105° C.

Under the same conditions as given in Example 29 1.65 parts by weight of acetaldehyde were produced per hour.

*Example 31*

12 parts by weight of active carbon ("Brilonit IV supra") were impregnated with a concentrated aqueous solution of 0.2 part by weight $PdCl_2$, 0.6 part by weight $CuCl_2 \cdot 2H_2O$, 0.1 part by weight $FeCl_3$ and 0.4 parts by weight $CrCl_3 \cdot 6H_2O$ and then dried at 105° C.

Under the same reaction conditions as given in Example 29 1.35 parts by weight of acetaldehyde were produced per hour.

*Example 32*

0.05 part by weight of $PdCl_2$, 0.5 part by weight of $CuCl_2 \cdot 2H_2O$ and 0.5 parts by weight of $FeCl_3$ were dissolved in 15 parts by weight of water. Then 10 parts by weight of active carbon ("Supersorbon WS III") were impregnated with the solution thus prepared and then dried at 105° C.

When a mixture of 6.1 parts by weight of $C_2H_4$ and 1.3 parts by weight $O_2$ which had been saturated with water vapor at 59° C. was passed over this contact per hour at 60° C., after a brief starting time 0.4 part by weight of acetaldehyde were obtained per hour.

*Example 33*

A gas mixture consisting of 2 vol. percent ethylene and 98 vol. percent air saturated with water vapor at a temperature of 80° C. was passed over 50 ml. of the catalyst described in Example 27, at a velocity of 8.2 liter per hour at 85° C. The ethylene was totally converted into acetaldehyde.

Example 34

A gas mixture consisting of 80 vol. percent ethylene and 20 vol. percent oxygen saturated with water vapor at 90° C. was passed over 50 ml. of a catalyst composed of 2% palladious chloride, 10% copper-(II)-chloride and 88% active carbon ("Supersorbon WS III") at a temperature of 102° C. and at a rate of 6 liters per hour. The acetaldehyde thus obtained amounted to 42%.

We claim:

1. A process for the production of a carbonyl compound from an olifinic hydrocarbon, said carbonyl compound being selected from the group consisting of aldehydes and ketones corresponding to said olefinic hydrocarbon and containing one less olefinic bond than the olefinic hydrocarbon, which consists essentially of passing a gas mixture containing an olefinic hydrocarbon and oxygen in the presence of water vapor over a supported catalyst containing a salt of a metal of the platinum group and a salt of a multivalent metal and recovering the carbonyl compound thus produced.

2. A process for the production of a carbonyl compound from an olefinic hydrocarbon, said carbonyl compound being selected from the group consisting of aldehydes and ketones corresponding to said olefinic hydrocarbon and containing one less olefinic double bond than the olefinic hydrocarbon, which comprises passing a gas mixture containing an olefinic hydrocarbon and oxygen at a temperature from above 0 to about 300° C. in the presence of water vapor over a water containing carrier supported catalyst containing ions of a metal of the platinum group and an ion selected from the group consisting of $Cl^-$, $Br^-$, $SO_4^=$ and $PO_4^\equiv$ ions and a water soluble salt of a multivalent metal selected from the group consisting of chlorides, bromides, sulphates and acetates of Fe, Cu, Mn, Co, Cr and V and recovering the carbonyl compound thus produced.

3. The process of claim 2 in which said ions of a metal of the platinum group are palladium ions.

4. The process of claim 2 in which the reaction is carried out under a pressure between 20 mm. Hg and 100 atmospheres.

5. The process of claim 2 in which the ratio of platinum metal ion sources to multivalent metal salt in said catalyst is such as to provide a ratio of platinum metal to multivalent metal between 1:1 and 1:20.

6. A process for the production of acetaldehyde from ethylene which comprises passing a gas mixture containing ethylene and oxygen at a temperature from above 0 to about 300° C. in the presence of water vapor over a water containing carrier supported catalyst containing ions of a metal of the platinum group and an ion selected from the group consisting of $Cl^-$, $Br^-$, $SO_4^=$ and $PO_4^\equiv$ ions and a water soluble salt of a multivalent metal selected from the group consisting of chlorides, bromides, sulfates and acetates of Fe, Cu, Mn, Co, Cr and V, the ratio of platinum metal ion sources to multivalent metal salt in such catalyst being such as to provide a ratio of platinum metal to multivalent metal between 1:1 and 1:20 and recovering the acetaldehyde thus produced.

7. The process of claim 6 in which the reaction is carried out at a temperature between 50 and 120° C. under atmospheric pressure.

8. The process of claim 6 in which said catalyst comprises a mixture of palladous and cupric chlorides.

9. The process of claim 6 in which said catalyst comprises a mixture of palladous and ferric chlorides.

10. The process of claim 6 in which said catalyst comprises a mixture of palladous, cupric and ferric chlorides.

11. A process for the production of acetone from propylene which comprises passing a gas mixture containing propylene and oxygen at a temperature from above 0 to 300° C. in the presence of water vapor over a water containing carrier supported catalyst containing ions of a metal of the platinum group and an ion selected from the group consisting of $Cl^-$, $Br^-$, $SO_4^=$ and $PO_4^\equiv$ ions and a water soluble salt of a multivalent metal selected from the group of chlorides, bromides, sulfates and acetates of Fe, Cu, Mn, Co, Cr and V, the ratio of platinum metal ion sources to multivalent metal salt in such catalyst being such as to provide a ratio of platinum metal to multivalent metal between 1:1 and 1:20 and recovering the acetone thus produced.

12. A process for the production of methyl ethyl ketone from n-butylene which comprises passing a gas mixture containing n-butylene and oxygen at a temperature from above 0 to about 300° C. in the presence of water vapor over a water containing carrier supported catalyst containing ions of a metal of the platinum group and an ion selected from the group consisting of $Cl^-$, $Br^-$, $SO_4^=$ and $PO_4^\equiv$ ions and a water soluble salt of a multivalent metal selected from the group of chlorides, bromides, sulfates and acetates of Fe, Cu, Mn, Co, Cr and V, the ratio of platinum metal ion sources to multivalent metal salt in such catalyst being such as to provide a ratio of platinum metal to multivalent metal between 1:1 and 1:20 and recovering the methyl ethyl ketone thus produced.

References Cited in the file of this patent

UNITED STATES PATENTS

| | | |
|---|---|---|
| 1,999,620 | Van Peski et al. | Apr. 30, 1935 |
| 2,523,686 | Engel | Sept. 26, 1950 |
| 2,690,457 | Hackmann | Sept. 28, 1954 |

FOREIGN PATENTS

| | | |
|---|---|---|
| 713,791 | Germany | Nov. 14, 1941 |
| 891,209 | France | Nov. 29, 1943 |
| 767,409 | Great Britain | Feb. 6, 1957 |

OTHER REFERENCES

Phillips: Amer. Chem. Jour., vol. 16, pp. 255–77 (pages 265–72 relied upon) (1894).

Chatt: Chem. Abstracts, vol. 48, page 5067 (1954).